United States Patent
Jin et al.

(10) Patent No.: US 11,245,956 B2
(45) Date of Patent: Feb. 8, 2022

(54) METHOD AND DEVICE FOR REPRODUCING CONTENT OF MOBILE DEVICE ON DISPLAY DEVICE

(71) Applicant: SAMSUNG ELECTRONICS CO., LTD., Suwon-si (KR)

(72) Inventors: Suhwan Jin, Suwon-si (KR); Eungsik Yoon, Suwon-si (KR); Kunsok Kang, Suwon-si (KR); Seungil Yoon, Suwon-si (KR); Taedon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/091,330

(22) Filed: Nov. 6, 2020

(65) Prior Publication Data

US 2021/0168439 A1 Jun. 3, 2021

(30) Foreign Application Priority Data

Dec. 3, 2019 (KR) .................. 10-2019-0159357

(51) Int. Cl.
*H04N 21/436* (2011.01)
*H04N 21/4363* (2011.01)
(Continued)

(52) U.S. Cl.
CPC ..... *H04N 21/43615* (2013.01); *G06F 3/1454* (2013.01); *H04N 21/4367* (2013.01); *H04N 21/43635* (2013.01); *H04N 21/43637* (2013.01)

(58) Field of Classification Search
CPC ............. H04N 21/4126; H04N 21/414; H04N 21/41407; H04N 21/4307;
(Continued)

(56) References Cited

U.S. PATENT DOCUMENTS 9,491,774 B2 11/2016 Kim et al.
2007/0130610 A1* 6/2007 Aarnio .................. H04H 40/27
725/134
(Continued)

FOREIGN PATENT DOCUMENTS

KR  10-2016-0016335 A  2/2016
KR  10-2016-0031724 A  3/2016
KR  10-2018-0075374 A  7/2018

OTHER PUBLICATIONS

International Search Report (PCT/ISA/210) and Written Opinion (PCT/ISA/237) dated Jan. 29, 2021 issued by the International Searching Authority in International Application No. PCT/KR2020/015275.

*Primary Examiner* — Fernando Alcon
(74) *Attorney, Agent, or Firm* — Sughrue Mion, PLLC

(57) ABSTRACT

A method and device for providing content are provided. The method includes receiving a connection request from a mobile device; connecting to the mobile device based on the connection request; obtaining, from the mobile device, identification information of the mobile device, application information of an application running on the mobile device, and content information about the content to be processed by the application; transmitting the identification information, the application information, and the content information to a casting device capable of performing cellular data communication; obtaining the content from the casting device; and outputting the content, wherein the content obtained from the casting device is received by the casting device through a cellular data communication network based on the content information and processed based on the application executed on the casting device.

20 Claims, 13 Drawing Sheets

(51) Int. Cl.
*G06F 3/14* (2006.01)
*H04N 21/4367* (2011.01)

(58) Field of Classification Search
CPC ....... H04N 21/43615; H04N 21/43637; H04N 21/4367; H04N 21/43635; G06F 3/1454
See application file for complete search history.

(56) References Cited

U.S. PATENT DOCUMENTS

| | | | | |
|---|---|---|---|---|
| 2007/0136488 | A1* | 6/2007 | Cho | H04L 67/02 709/231 |
| 2012/0240144 | A1* | 9/2012 | Rose | H04N 21/4756 725/14 |
| 2012/0311100 | A1* | 12/2012 | Kim | H04N 21/44204 709/219 |
| 2013/0290863 | A1* | 10/2013 | Chen | G06F 3/0481 715/747 |
| 2014/0032627 | A1* | 1/2014 | Lorenz | H04L 65/4076 709/201 |
| 2014/0164558 | A1* | 6/2014 | Moon | H04L 12/281 709/217 |
| 2014/0362293 | A1* | 12/2014 | Bakar | H04L 67/1061 348/552 |
| 2015/0304701 | A1* | 10/2015 | Li | H04N 21/47217 386/234 |
| 2016/0259855 | A1* | 9/2016 | Jwa | G06Q 30/0251 |
| 2016/0366468 | A1* | 12/2016 | Seo | G06F 3/04842 |
| 2017/0026686 | A1 | 1/2017 | Glazier et al. | |
| 2017/0060518 | A1 | 3/2017 | Hong et al. | |
| 2018/0183840 | A1 | 6/2018 | Lee | |
| 2018/0341453 | A1* | 11/2018 | Nakagawa | H04M 1/72412 |
| 2018/0367850 | A1* | 12/2018 | Kageyama | H04N 21/4222 |
| 2019/0069015 | A1 | 2/2019 | Kiley et al. | |
| 2020/0053399 | A1* | 2/2020 | Choi | H04N 21/2387 |
| 2021/0105522 | A1* | 4/2021 | Grigore | H04N 21/431 |

* cited by examiner

METHOD AND DEVICE FOR REPRODUCING CONTENT OF MOBILE DEVICE ON DISPLAY DEVICE

CROSS-REFERENCE TO RELATED APPLICATION

This application is based on and claims priority under 35 U.S.C. § 119 to Korean Patent Application No. 10-2019-0159357, filed on Dec. 3, 2019, in the Korean Intellectual Property Office, the disclosure of which is incorporated by reference herein in its entirety.

BACKGROUND

1. Field

The disclosure relates to a method and a casting device for providing content via an electronic device having a display function (e.g., television), the content being currently provided or to be provided by a mobile device, and more particularly, to a method and a casting device for providing content from a device communicatively connected to a display device so as to provide a seamless user experience in viewing the content.

2. Description of Related Art

Mobile devices generally include small display screens. Although such small display screens provide a better portability of mobile devices, the small display screens also prevent users from fully enjoying contents such as videos or games.

In addition, the power consumption of displays has the highest proportion of power consumption among all the parts of mobile devices. Considering that mobile devices have smaller sizes and lighter weights and include batteries integrated therein, efficient consumption of batteries may be a significant factor for improving usability of the mobile devices.

On the other hand, users show a gradually increasing tendency to prefer large-screen display devices (e.g., televisions (TVs) and the like). However, large-screen display devices are generally used at fixed locations and connected to power supplies or outlets attached to a wall to provide sufficient power to drive the large-screen display devices. Thus, the following methods to allow devices including large display screens to be used as displays of mobile devices have been developed.

As representative methods, mirroring and casting have been used.

Mirroring is a technique for providing images and sounds from mobile devices to display devices. When mobile devices perform mirroring while reproducing a video, the same video as displayed on the mobile device is displayed on a display device and the same sound are output through the display device. However, when users perform other functions on the mobile devices, videos and sound output from the mobile devices may be changed. Accordingly, the videos and sounds output from display devices are also changed. To receive content, such as videos, without any interruption in the mirroring, users generally cannot perform other functions on the mobile devices, but solely required to playback the video on the mobile device to avoid any interruption in the mirroring.

Casting is a technique for outputting only content output from particular applications of mobile devices to display devices. When mobile devices perform casting while reproducing videos, the videos are reproduced on display devices. In this case, unlike mirroring, even when users change the screen and sound outputs to use mobile devices for other purposes, the videos may continue to be reproduced on the display devices.

SUMMARY

In the case where display devices are used as content providing means by interworking with mobile devices, when the display devices do not include corresponding functions, the display devices may perform the corresponding functions by connecting to separate devices supporting mirroring or casting. Devices supporting mirroring or casting functions may be implemented in the form of dongles and may support wired and wireless connection to mobile devices and display devices.

When separate devices supporting mirroring or casting functions are used, mobile devices and display devices may constitute the same subnets, and the separate devices also need to be connected to the same subnets. To use the corresponding devices, users of mobile devices may need to install network setting programs by accessing the corresponding devices and perform network setting.

In addition, to use mirroring or casting functions, users of mobile devices need to directly change settings of the mobile devices or settings of applications running on the mobile devices such that desired content is provided by display devices. The need for such additional operations may be a factor of reducing immersion and concentration of users regarding content by affecting continuous use and may consequently deteriorate user experience.

In addition, in the case where mirroring is used to allow display devices to provide content provided by mobile devices, only when mobile devices are not used for other purposes except for providing the content as described above, the content may be provided without interruption by using entire screens of the display devices.

According to an embodiment, there is provided a method of providing content, performed by an electronic device, the method includes: receiving a connection request from a mobile device; connecting to the mobile device based on the connection request; obtaining, from the mobile device, identification information of the mobile device, application information of an application running on the mobile device, and content information about the content to be processed by the application; transmitting the identification information, the application information, and the content information to a casting device capable of performing cellular data communication; obtaining the content from the casting device; and outputting the content, wherein the content obtained from the casting device is received by the casting device through a cellular data communication network based on the content information and processed based on the application executed on the casting device.

The receiving the connection request is based on a sensing result of a sensor in at least one of the mobile device or the electronic device.

The connecting to the mobile device includes connecting by using Bluetooth communication.

The obtaining of the identification information of the mobile device, the information about the application running on the mobile device, and the information about the content to be processed by the application includes connecting to the mobile device by using Wi-Fi communication.

The electronic device and the casting device communicate with each other by using high definition multimedia interface (HDMI) communication.

According to an embodiment, there is provided a method of providing content, performed by a casting device, the method includes: obtaining, from an electronic device connected to a mobile device, identification information of the mobile device, application information of an application running on the mobile device, and content information about the content to be processed by the application; executing the application based on the application information; receiving, from a server, the content through a cellular data communication network, based on the content information about the content; processing the received content according to the executed application; and transmitting the processed content to the electronic device.

The executing the application includes: determining whether the application is installed on the casting device, based on the application information; based on determining that the application is not installed on the casting device, downloading the application through the cellular data communication network; and installing the application on the casting device.

The application information includes information about a user account, and the application is executed based on the information about the user account.

The electronic device and the casting device communicate with each other using high definition multimedia interface (HDMI) communication.

According to an embodiment, there is provided an electronic device for providing content, the electronic device includes: a communication interface configured to receive a connection request from a mobile device; an interface; and a processor configured to: control the communication interface to connect to the mobile device based on the connection request; obtain, from the mobile device, identification information of the mobile device, application information of an application running on the mobile device, and content information about the content to be processed by the application; transmit, through the interface, the identification information, the application information, and the content information to a casting device capable of performing cellular data communication; obtain the content from the casting device through the interface; and output the content, wherein the content obtained from the casting device is received by the casting device through a cellular data communication network based on the content information and processed based on the application executed on the casting device.

The electronic device further includes at least one sensor, where the connection request is based on a sensing result of at least one of the mobile device or the at least one sensor.

The communication interface is further configured to support Bluetooth communication and connect to the mobile device based on the Bluetooth communication.

The communication interface is further configured to support Wi-Fi communication, and the identification information of the mobile device, the information about the application running on the mobile device, and the information about the content to be processed by the application are obtained based on a Wi-Fi connection.

The interface includes a high definition multimedia interface (HDMI), and the electronic device is connected to the casting device through the HDMI.

According to an embodiment, there is provided a casting device for providing content, the casting device includes: an interface configured to obtain, from an electronic device connected to a mobile device, identification information of the mobile device, application information of an application running on the mobile device, and content information about the content to be processed by the application; a communication interface; and a processor configured to: execute the application based on the application information; control the communication interface to receive, from a server, the content through the cellular data communication network based on the content information; process the received content according to the executed application; and transmit the processed content to the electronic device.

The processor is further configured to: determine whether the application is installed on the casting device, based on the application information; based on determining that the application is not installed on the casting device, download the application through the cellular data communication network; and install the application on the casting device.

The application information includes information about a user account, and the application is executed based on the information about the user account.

The interface includes a high definition multimedia interface (HDMI), and the casting device is connected to the electronic device by using the HDMI.

A non-transitory computer-readable recording medium having recorded thereon a computer program for performing the method of providing content by the electronic device described above.

A non-transitory computer-readable recording medium having recorded thereon a computer program for performing the method of providing content by the casting device described above.

Additional aspects will be set forth in part in the description which follows and, in part, will be apparent from the description, or may be learned by practice of the presented embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
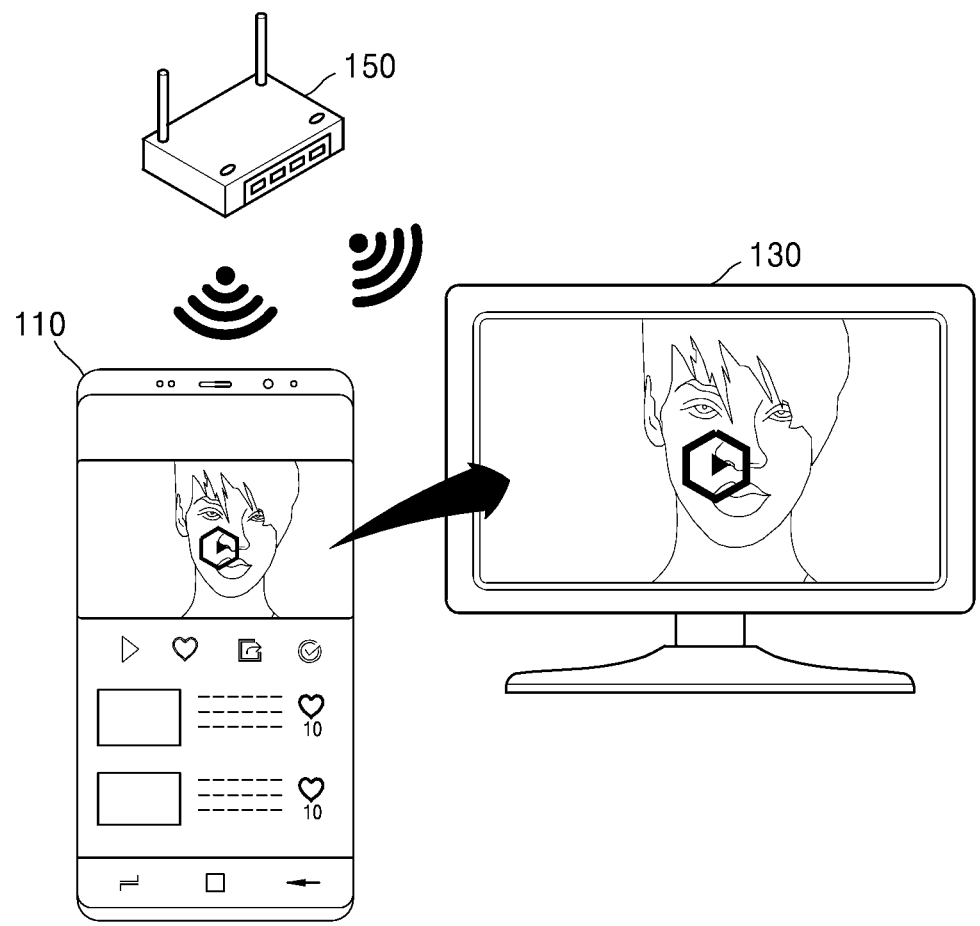
FIG. 1 is a diagram illustrating a system in which an electronic device outputs content of a mobile device, according to an embodiment.

The following detailed description of the disclosure will be made with reference to the accompanying drawings illustrating, as examples, particular embodiments allowing the disclosure to be implemented. These embodiments will be described in detail so as to allow a person of ordinary skill in the art to understand and implement the embodiments of the disclosure. It should be understood that, although various embodiments of the disclosure may be different from each other, the embodiments do not need to be mutually exclusive.

For example, particular shapes, structures, and characteristics described herein may be implemented to be changed from one embodiment to another embodiment of the disclosure without departing from the spirit and scope of the disclosure. In addition, it should be understood that positions or arrangements of individual components in each embodiment of the disclosure may also be changed without departing from the spirit and scope of the disclosure. Therefore, it should be understood that the following detailed descriptions are not to be construed in any way as limiting the disclosure, and that the scope of the disclosure encompasses the accompanying claims and equivalents thereof.

In the drawings, similar reference numerals represent the same or similar components in various aspects. In addition, in the drawings, portions irrelevant to the description are omitted for clarity, and like components are denoted by like reference numerals throughout the disclosure.

Hereinafter, for those of ordinary skill in the art to implement the disclosure with ease, various embodiments of the disclosure will be described in detail with reference to the accompanying drawings. However, it should be understood that the disclosure is not limited to embodiments described herein and may be embodied in different ways.

Throughout the disclosure, when an element is referred to as being "connected to" another element, the element can be "directly connected to" the other element or can be "electrically connected to" the other element with an intervening element therebetween. In addition, when a region such as an element, a component, a layer, or the like is referred to as "comprising" or "including" a component, the region may further include another component in addition to the component rather than excludes the other component, unless otherwise indicated.

Throughout the disclosure, the expression "at least one of a, b or c" may indicate only a, only b, only c, both a and b, both a and c, both b and c, all of a, b, and c, or variations thereof.

Hereinafter, embodiments of the disclosure will be described in detail with reference to the accompanying drawings.

FIG. 1 is a diagram illustrating a system in which an electronic device outputs content of a mobile device.

Referring to FIG. 1, a system 100 may include a mobile device 110, an electronic device 130, and an access point 150.

To perform casting, the mobile device 110 transmits a casting request to the electronic device 130 to provide content that is being reproduced in the mobile device 110 to the electronic device 130, and the electronic device 130 having received the casting request may receive the content through the access point 150 and reproduces the content on a display of the electronic device 130.

To use a casting function in such a manner, the mobile device 110 and the electronic device 130 may need to constitute the same subnet. Accordingly, the mobile device 110 and the electronic device 130 may need to be connected to the same access point 150, and initial settings for access point connection may need to be performed before implementing the casting function.

When the electronic device 130 does not support the casting function, the casting function may be used by connecting a device supporting casting to the electronic device 130. When a separate device is connected and used, a set-up process for connecting the separate device to the mobile device 110 and the electronic device 130 is added, and the separate device may need to be connected to the same access point 150 as those of the mobile device 110 and the electronic device 130.

In addition, although only an example of using casting has been described for convenience of description, even when mirroring is used, there are similar restrictions according to network settings and whether the application is supported.

Figure 2:
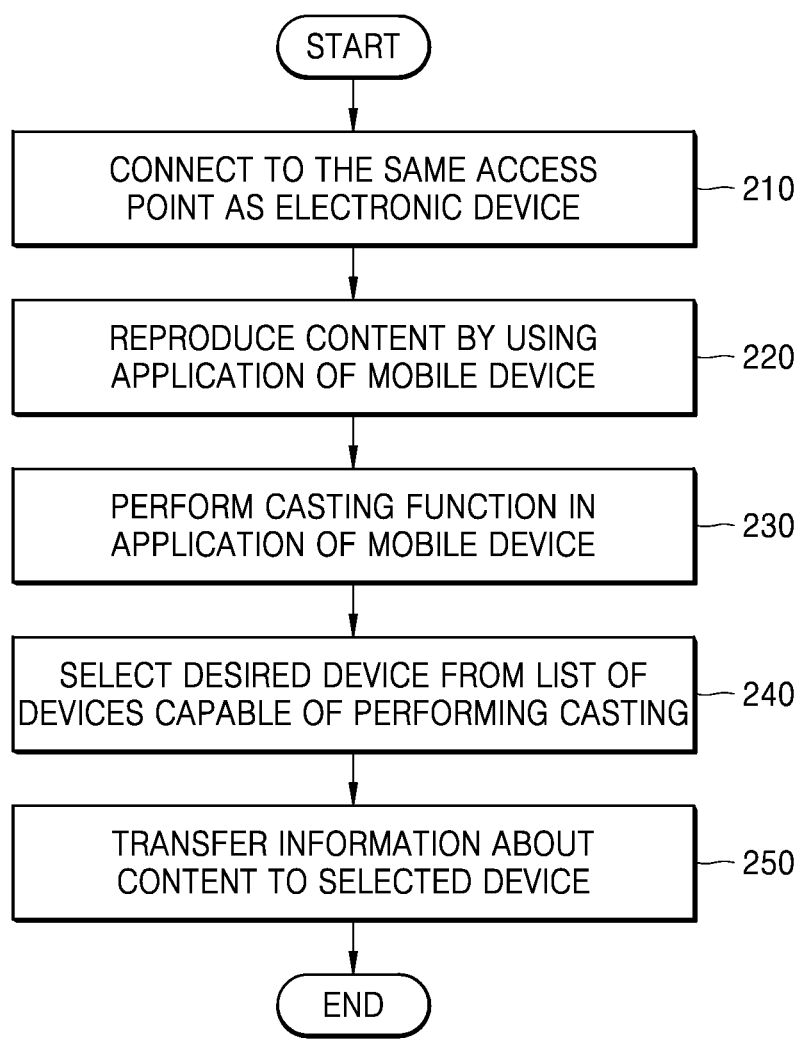
FIG. 2 is a flowchart of operations of a mobile device in the system of FIG. 1 according to an embodiment.

FIG. 2 is a flowchart of operations of the mobile device 110 in the system 100 of FIG. 1.

In the system 100, after the mobile device 110 and the electronic device 130 are connected to the same access point 150 (210), when a user intends to reproduce the content on the electronic device 130 while reproducing the content on the mobile device 110 using an application on the mobile device 110 (220), operations performed by the mobile device 110 are as follows.

When the user executes the casting function in an application reproducing the content (230), the application searches for electronic devices capable of performing casting through network searching and shows a list of casting available electronic devices to the user. When the user selects a desired electronic device 130 from the list (240), the mobile device 110 transfers information of the mobile device 110 and content information to the selected electronic device 130 (S250).

Although only the method of casting the content from the mobile device 110 to the electronic device 130 has been described above for convenience, the user of the mobile device 110 may mirror the content to the electronic device 130 through a similar process.

Because a large number of user inputs are required for connection set-up and use of casting, a delay for processing and waiting for user inputs occurs, and this delay may be a factor of deteriorating use-satisfaction of the user. In particular, in services, such as streaming media services or online game services, which provide content in real time and put importance on continuity, a delay may significantly deteriorate user experience.

In addition, when the electronic device 130 does not support an application compatible with the application of the mobile device 110, the electronic device 130 may be unable to provide the content.

Figure 3:
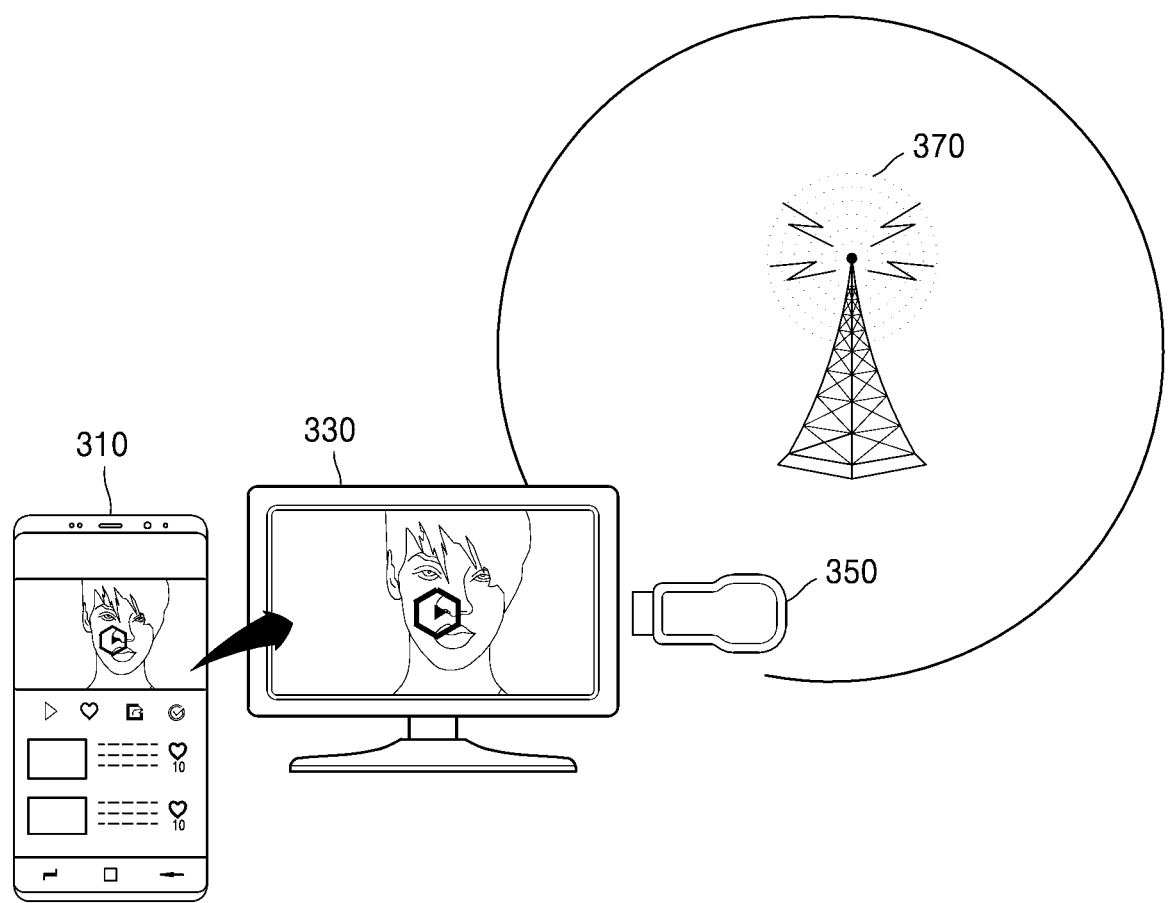
FIG. 3 is a diagram illustrating a system in which an electronic device outputs content of a mobile device according to an embodiment.

FIG. 3 is a diagram illustrating a system in which an electronic device outputs content of a mobile device, according to an embodiment.

Referring to FIG. 3, a system 300 includes a mobile device 310, an electronic device 330, a casting device 350 capable of performing cellular data communication, and a cellular data network 370.

To cast content, which is being reproduced on the mobile device 310, to the electronic device 330, the mobile device 310 transmits a casting request to the electronic device 330, and the electronic device 330 having received the casting request transfers the casting request to the casting device 350. Here, the casting request may include information about the mobile device 310, information about an application reproducing the content on the mobile device 310, and information about the content that is being reproduced.

The casting device 350 having received the casting request receives the content through the cellular data network 370. Because the casting device 350 connected to the electronic device 330 is able to independently perform data transmission and reception through the cellular data network 370, the casting device 350 may receive the content regardless of whether the casting device 350 is connected to the same access point as those of the mobile device 310 and the electronic device 330.

The received content is processed by the application installed in the casting device 350, and the processed content is transferred to and reproduced on the electronic device 330. Here, when the application for processing the content is not installed in the casting device 350, the casting device 350 may download and install the application thereto through the cellular data network 370, and then, may process the content.

Figure 4:
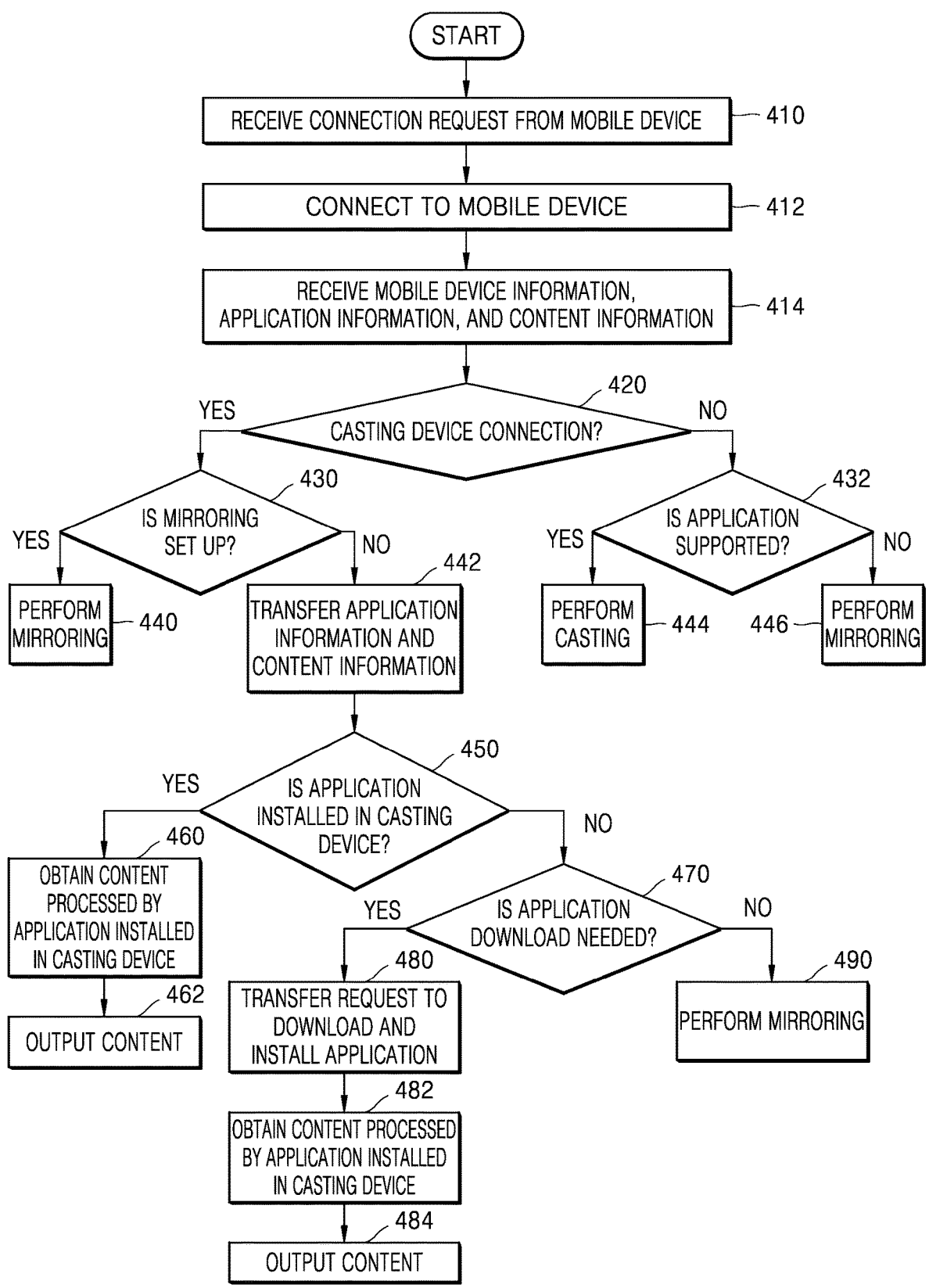
FIG. 4 is a flowchart of operations of a system in which an electronic device outputs content of a mobile device according to various situations, according to an embodiment.

FIG. 4 is a flowchart of operations of a system in which an electronic device outputs content of a mobile device according to various situations, according to an embodiment of the disclosure.

In the system 300, when the user intends to reproduce the content on the electronic device 330 while reproducing the content on the mobile device 310, the mobile device 310 transmits a request for connection to the electronic device 330, and then, operations performed by the electronic device 330 are as follows.

When the connection request from the mobile device 310 is received (410) and the electronic device 330 is connected to the mobile device 310 (412), the electronic device 330 receives, from the mobile device 310, information about the mobile device 310, information about the content that is being reproduced on the mobile device 310, and information about an application reproducing the content (414).

Here, the information about the mobile device 310 may include at least one of identification information of the mobile device 310, information about the user of the mobile device 310, model information of the mobile device 310, or hardware information (a MAC address or the like) of the mobile device 310. According to an embodiment, the information about the mobile device 310 may be obtained in the process of pairing.

The information about the content that is being reproduced on the mobile device 310 may include at least one of the type of content, identification information of the content, rating (parental guide (PG)) information of the content, information about a location (URL or the like) of the content, or copyright information of the content. The information about the application reproducing the content may include at least one of identification information of the application, version information of the application, an operating system capable of supporting the application, or information about a user account registered with the application. According to an embodiment, the information about the content and the information about the application may be obtained through Wi-Fi direct.

The electronic device 330 having received both the casting request and the information from the mobile device 310 checks whether the casting device 350 capable of performing cellular data communication is connected thereto (420).

According to another embodiment, when the casting device 350 is in an unavailable state although connected to the electronic device 330, the electronic device 330 may determine that the casting device 350 is not connected thereto.

As a result of checking whether the casting device 350 is connected to the electronic device 330 (420), when it is determined that the casting device 350 is not connected thereto, it may be further determined whether the electronic device 330 supports the application reproducing the content (432). The electronic device 330 supports the application when the application is executable on an operating system of the electronic device 330 or a platform of the electronic device 330.

When it is determined that the electronic device 330 does not support the application, the electronic device 330 sets up a connection to the mobile device 310 for mirroring and displays the content through mirroring (446). When it is determined that the electronic device 330 supports the application, the electronic device 330 executes the application installed therein and displays the content through casting (444). Here, the electronic device 330 directly receives the content through a network to which the electronic device 330 is connected to, based on the information about the content, the information being transferred from the mobile device 310.

As a result of checking whether the casting device 350 is connected to the electronic device 330 (420), when it is determined that the casting device 350 is connected thereto, the electronic device 330 further determines whether the mirroring can be set up between the mobile device 310 and the electronic device 330 (430). In some cases, casting may be limited by a request of a provider (content provider (CP)) of the content, and it may be set up to perform mirroring according to a usage pattern of the user or according to the available bandwidth of a cellular data usage of the casting device 350.

When it is determined that the setting for the content or the mobile device 310 is mirroring, the electronic device 330 sets up a connection to the mobile device 310 for mirroring and displays the content through mirroring (440). On the other hand, when it is not set up to use mirroring for the content or the mobile device 310, the electronic device 330 transfers the information about the application and the information about the content to the casting device 350 (442) to check whether the application is installed in the casting device 350 (450).

When it is determined that the application is installed on the casting device 350, the electronic device 330 obtains the content processed by the application installed in the casting device 350 (460) and outputs the obtained content (462). Here, the casting device 350 may receive the content from a server by using a cellular communication function embedded therein and a cellular network and may process the content.

However, when it is determined that the application is not installed, the electronic device 330 determines whether to download the application to the casting device 350 (470). Such determination may be performed based on pre-settings or user settings of each device.

When it is determined that the casting device 350 needs to download the application, the electronic device 330 transfers, to the casting device 350, a request to download and install the application (480). The casting device 350 having received the request to download may download and install the application thereto. Here, the casting device 350 may search for and download the application by using a cellular communication function embedded therein to communicate with a cellular network. When the download and installation of the application are complete, the casting device 350 executes the application, processes the content, and transfers the processed content to the electronic device 330, and the electronic device 330 obtains the content processed by the casting device 350 (482) and outputs the obtained content (484). Here, the casting device 350 may receive the content from a content server by using a cellular communication function embedded therein to communicate with a cellular network and may process the content.

As a result of checking whether to download the application, when it is determined that the casting device 350 does not need to download the application, the electronic device 330 may provide the content by using mirroring (490).

According to an embodiment, whether to download the application may be determined by a user input through the mobile device 310. When it is determined that the application is not installed in the casting device 350, the mobile device 310 may provide, to the user, a pop-up menu or the like for selecting whether to download the application, whether to perform mirroring, whether to perform casting through the electronic device 330, or whether to stop providing the content through the electronic device 330. The mobile device 310 may receive an input from a user, and may transfer the corresponding input to the electronic device 330.

Figure 5:
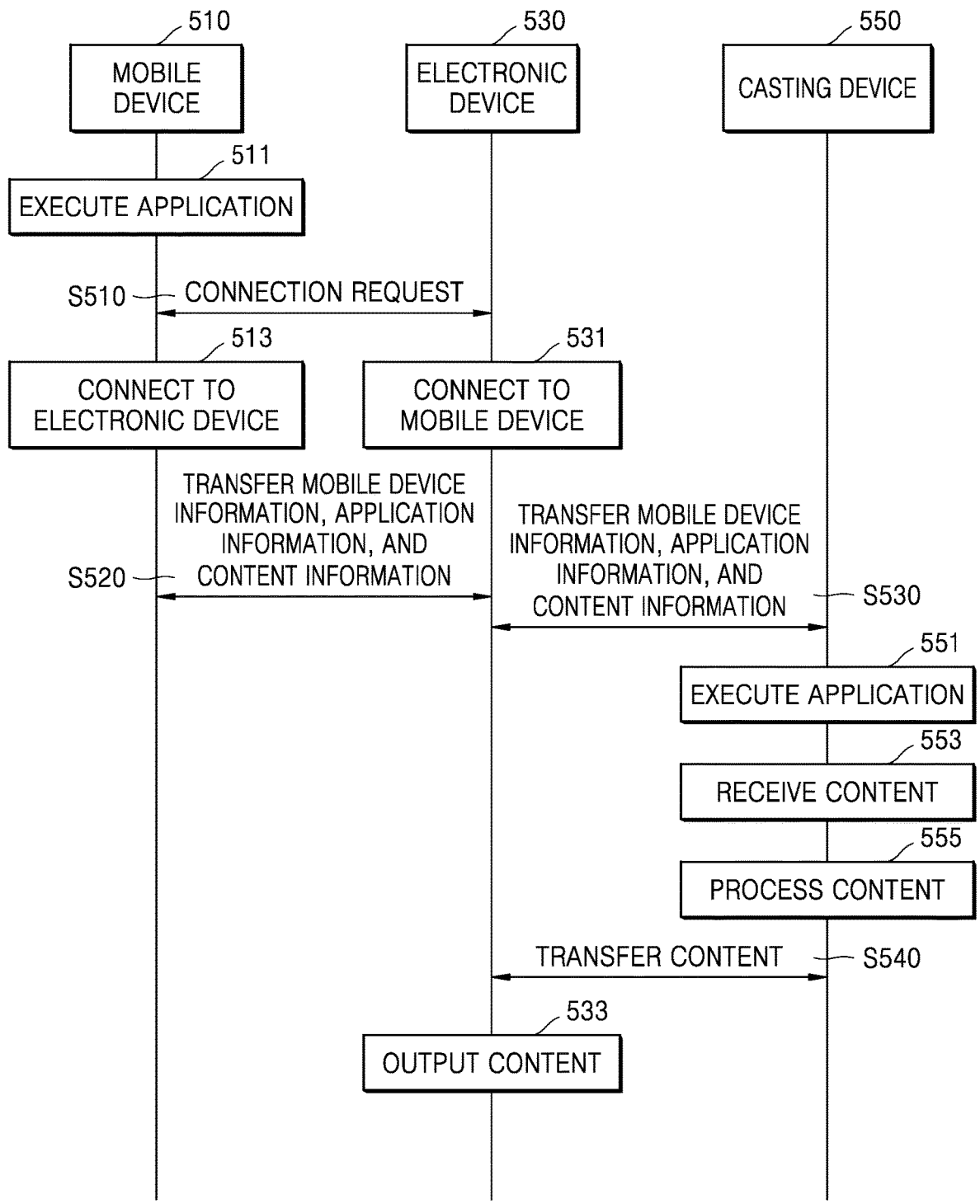
FIG. 5 is a flowchart of operations of a system in which an electronic device outputs content of a mobile device according to an embodiment.

FIG. 5 is a flowchart of operations of a system in which an electronic device outputs content of a mobile device according to an embodiment.

Referring to FIG. 5, a system 500 includes a mobile device 510, an electronic device 530, and a casting device 550.

A user of the mobile device 510 may execute an application installed in the mobile device 510 (511) and may be provided with content through the application. When the user of the mobile device 510 intends to receive the content by using hardware of the electronic device 530 while the content is being provided, the mobile device 510 transfers a connection request to the electronic device 530 (S510). The electronic device 530 having received the connection request from the mobile device 510 transmits a response indicating an acceptance of the connection request (S510), and the electronic device 530 and the mobile device 510 may establish connection to each other (513, 531). A particular method of transferring the connection request from the mobile device 510 to the electronic device 530, and a particular method of connecting the electronic device 530 to the mobile device 510 will be described below.

The mobile device 510 connected to the electronic device 530 transfers, to the electronic device 530, information about the mobile device 510, information about the content that is being reproduced on the mobile device 510, and information about the application reproducing the content (S520). The electronic device 530 connected to the mobile device 510 and having received the required pieces of information from the mobile device 510 transfers the pieces of information to the casting device 550 (S530).

Here, the information about the mobile device 510 may include at least one of identification information of the mobile device 510, information about the user of the mobile device 510, model information of the mobile device 510, or hardware information (a MAC address or the like) of the mobile device 510. According to an embodiment, the information about the mobile device 510 may be obtained in the process of pairing.

The information about the content that is being reproduced on the mobile device 510 may include at least one of the type of content, identification information of the content, age rating (parental guide (PG)) information of the content, information about a location (URL or the like) of the content, or copyright information of the content. The information about the application reproducing the content may include at least one of a name of the application, version information of the application, an operating system capable of supporting the application, or information about a user account registered with the application. In addition, the information about the content and the information about the application may be obtained through Wi-Fi direct.

The casting device 550 according to an embodiment may independently perform a cellular data communication function, transmit and receive data by using a cellular data network, and install an additional application therein. In addition, the casting device 550 according to an embodiment may be connected to the electronic device 530 through high definition multi-media interface (H DMI).

When the electronic device 530 is connected to the casting device 550 through HDMI, use of HDMI-consumer electronics control (CEC) may allow each device to obtain information of each other and to control functions of each other. In this case, by using HDMI-CEC, the electronic device 530 may recognize the type and name of the casting device 550 or may control power of the casting device 550 and may also set the casting device 550 to perform other detailed operations. Although the name of a CEC function may be differently determined for each device manufacturer, when the CEC function of each device is implemented to satisfy HDMI-CEC specifications, the compatibility of the CEC function of each device may be ensured regardless of manufacturers.

When the casting device 550 is not recognized through HDMI-CEC or information is not received through HDMI-CEC, the user of the electronic device 530 may manually allow the electronic device 530 to recognize the casting device 550 or may manually enter information of the casting device 550.

The casting device 550, which has received the information about the mobile device 510, the information about the application, and the information about the content from the electronic device 530 (S530), may execute the application installed in the casting device 550 based on the received information about the application (551). Here, when the information about the application includes account information, the application of the casting device 550 may be executed by using the same account as that of the application of the mobile device 510. When the application is executed by the same account, user settings, user-customized recommended content, a content reproduction history, and the like may be maintained, and the user may use the application more conveniently.

After the execution of the application, the casting device 550 receives the content based on the received information about the content (553). The information about the content may include an address of a server in which the content is stored, and the casting device 550 may independently perform a cellular data communication function and may receive the content from the server by using a cellular data network.

The received content is processed by the application executed on the casting device 550 (555), and the processed content is transferred to the electronic device 530 (S540). The electronic device 530 outputs, through a display and a speaker of the electronic device 530, the processed content transferred from the casting device 550 (533).

Figure 6:
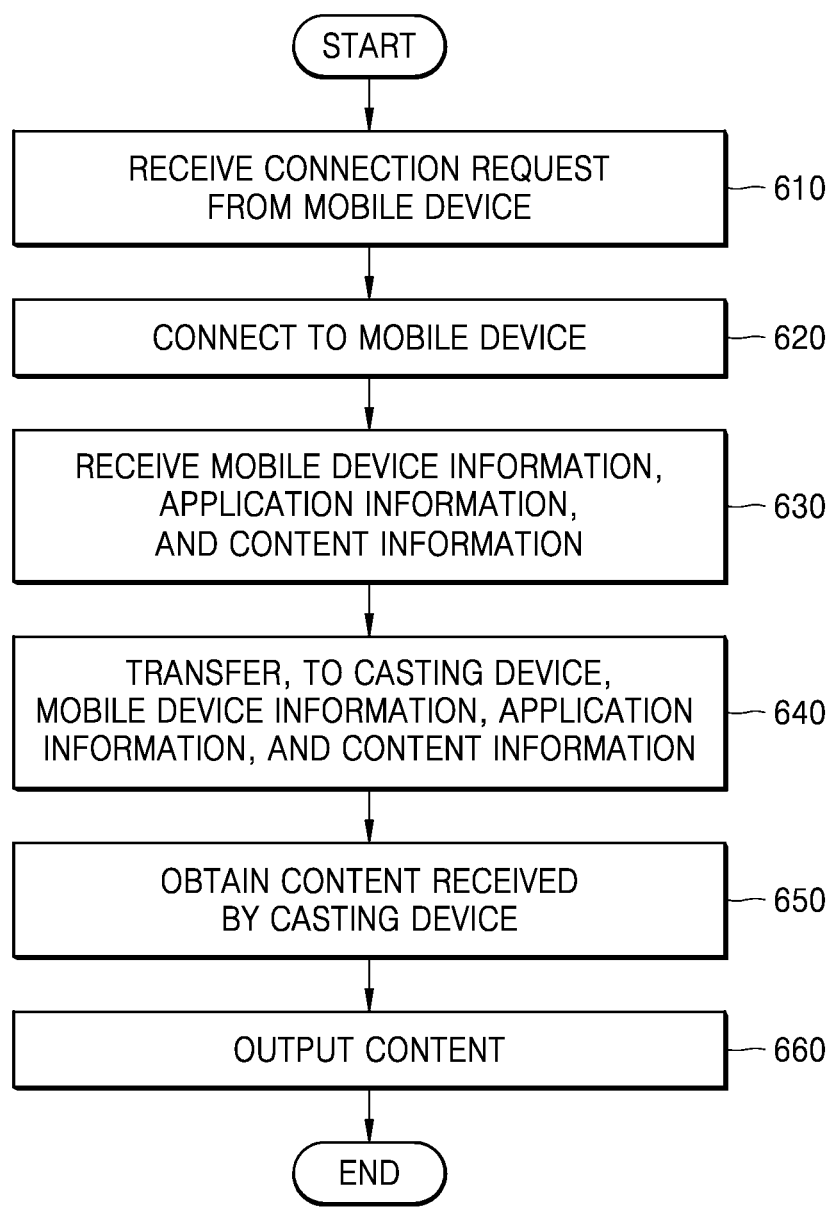
FIG. 6 is a flowchart of operations of an electronic device in a system in which the electronic device outputs content of a mobile device according to an embodiment.

FIG. 6 is a flowchart of operations of an electronic device in a system in which the electronic device outputs content of a mobile device according to an embodiment.

When a connection request of the mobile device is received (610), the electronic device may establish connection with the mobile device based on the connection request (620). Here, the connection request may be transmitted to the electronic device based on a sensing result of at least one sensor included in the mobile device or the electronic device, and the connection may be performed by using at least one short-range communication method from among Bluetooth, WiFi, Zigbee, and near field communication (NFC).

The electronic device connected to the mobile device may receive, from the mobile device, information about the mobile device, information about the content that is being reproduced on the mobile device, and information about an application reproducing the content (630), and may transfer the received pieces of information to a casting device (640).

Next, the electronic device receives the content from the casting device (650) and outputs the received content (660). Because the content received from the casting device is processed to be able to be reproduced on the electronic device by using the application installed in the casting device, the electronic device may directly output the content through a screen and a speaker without separate processing of the content.

Figure 7:
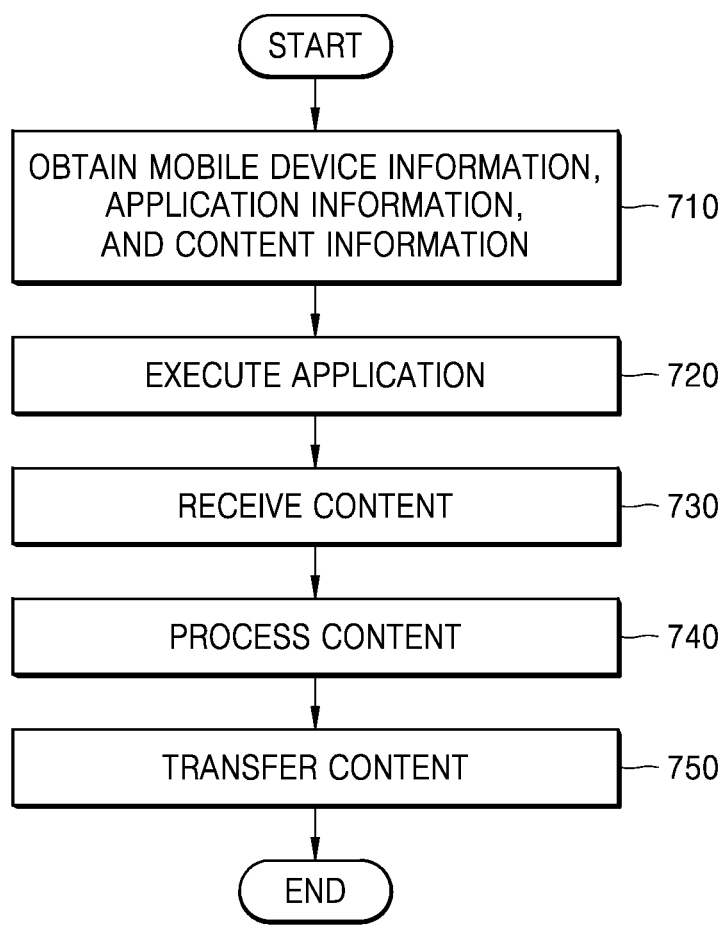
FIG. 7 is a flowchart of operations of a casting device in a system in which an electronic device outputs content of a mobile device according to an embodiment.

FIG. 7 is a flowchart of operations of a casting device in a system in which an electronic device outputs content of a mobile device according to an embodiment.

The casting device may obtain, from the electronic device, information about the mobile device, information about the content that is being reproduced on the mobile device, and information about an application reproducing the content (710). The casting device may be connected to the electronic device through HDMI. When the electronic device is connected to the casting device through HDMI, use of HDMI-CEC may allow each device to control functions of each other through HDMI.

When the information about the mobile device, the information about the content that is being reproduced on the mobile device, and the information about the application reproducing the content are obtained from the electronic device (710), the casting device executes the application installed in the casting device, based on the obtained information about the application (720). The application installed in the casting device may be an application capable of being installed in a platform of the casting device, the platform being produced and distributed by the same entity as that of the application of the mobile device. However, the embodiment is not limited thereto, and the platform may be provided by a different provider from that of the application.

Here, when the information about the application includes account information, the application of the casting device may be executed by using the same account as that of the application of the mobile device. When the application is executed by the same account, user settings, user-customized recommended content, a content reproduction history, and the like may be maintained, and the user may use the application more conveniently.

After the execution of the application, the casting device receives the content based on the obtained information about the content (730). The information about the content may include an address of a server in which the content is stored, and the casting device may independently perform a cellular data communication function and may receive the content from the server by using a cellular data network.

The received content is processed by the application executed on the casting device (740), and the processed content is transferred to the electronic device (750).

Figure 8:
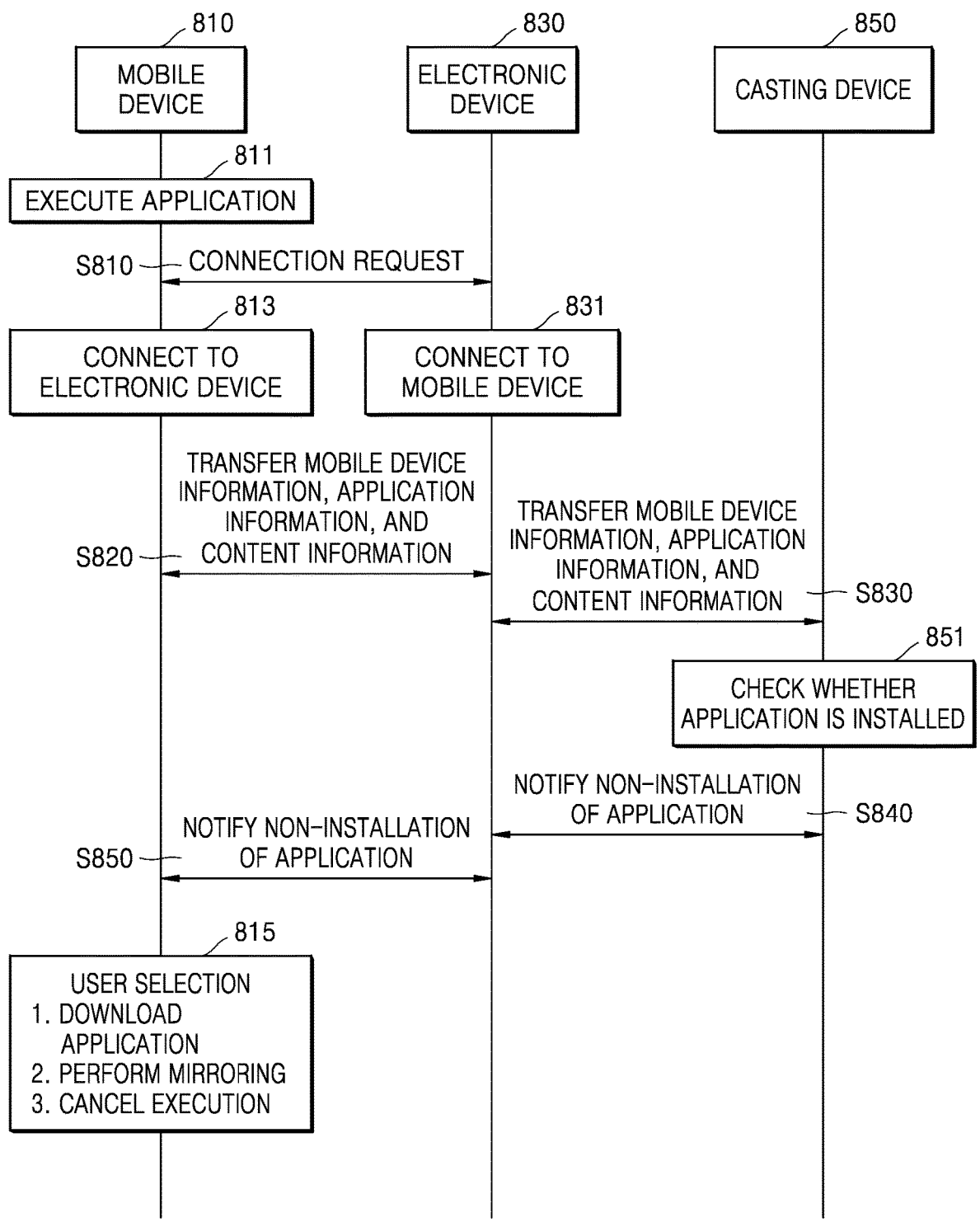
FIG. 8 is a flowchart of operations of a system in which an electronic device outputs content of a mobile device according to another embodiment.

FIG. 8 is a flowchart of operations of a system in which an electronic device outputs content of a mobile device according to another embodiment.

The system shown in FIG. 8 includes a mobile device 810, an electronic device 830, and a casting device 850.

A user of the mobile device 810 may execute an application installed in the mobile device 810 (811) and may receive content through the application. When the user of the mobile device 810 intends to display the content on the electronic device 830 while the content is being provided in the mobile device 810, the mobile device 810 transfers a connection request to the electronic device 830. The electronic device 830 having received the connection request from the mobile device 810 transmits a response to the connection request (S810) to establish connection with the mobile device 810, and the electronic device 830 and the mobile device 810 are connected to each other (813, 831).

The mobile device 810 connected to the electronic device 830 transfers, to the electronic device 830, information about the mobile device 810, information about the content that is being reproduced on the mobile device 810, and information about the application reproducing the content (S820). The electronic device 830 connected to the mobile device 810 and having received the required pieces of information from the mobile device 810 transfers the pieces of information to the casting device 850 (S830).

The casting device 850 checks whether the application is installed in the casting device 850 based on the received information about the application (851). As a result of the checking, when it is determined that the application is not installed, the casting device 850 transfers an application non-installation notification to the electronic device 830 (S840), and the electronic device 830 having received the application non-installation notification transfers the application non-installation notification to the mobile device 810 (S850).

The mobile device 810 having received the application non-installation notification displays a notification indicating non-installation of the application on the casting device 850 and requests a user input regarding the next operation. Here, the mobile device 810 may display, on a screen thereof, a graphical user interface (GUI) showing whether to download the application to the casting device 850, whether to reproduce the content on the electronic device 830 through mirroring, or whether to cancel the execution (815). After receiving the user input selecting one of the options, the system may be operated according to the operation flow for each situation as shown in FIG. 4.

Figure 9:
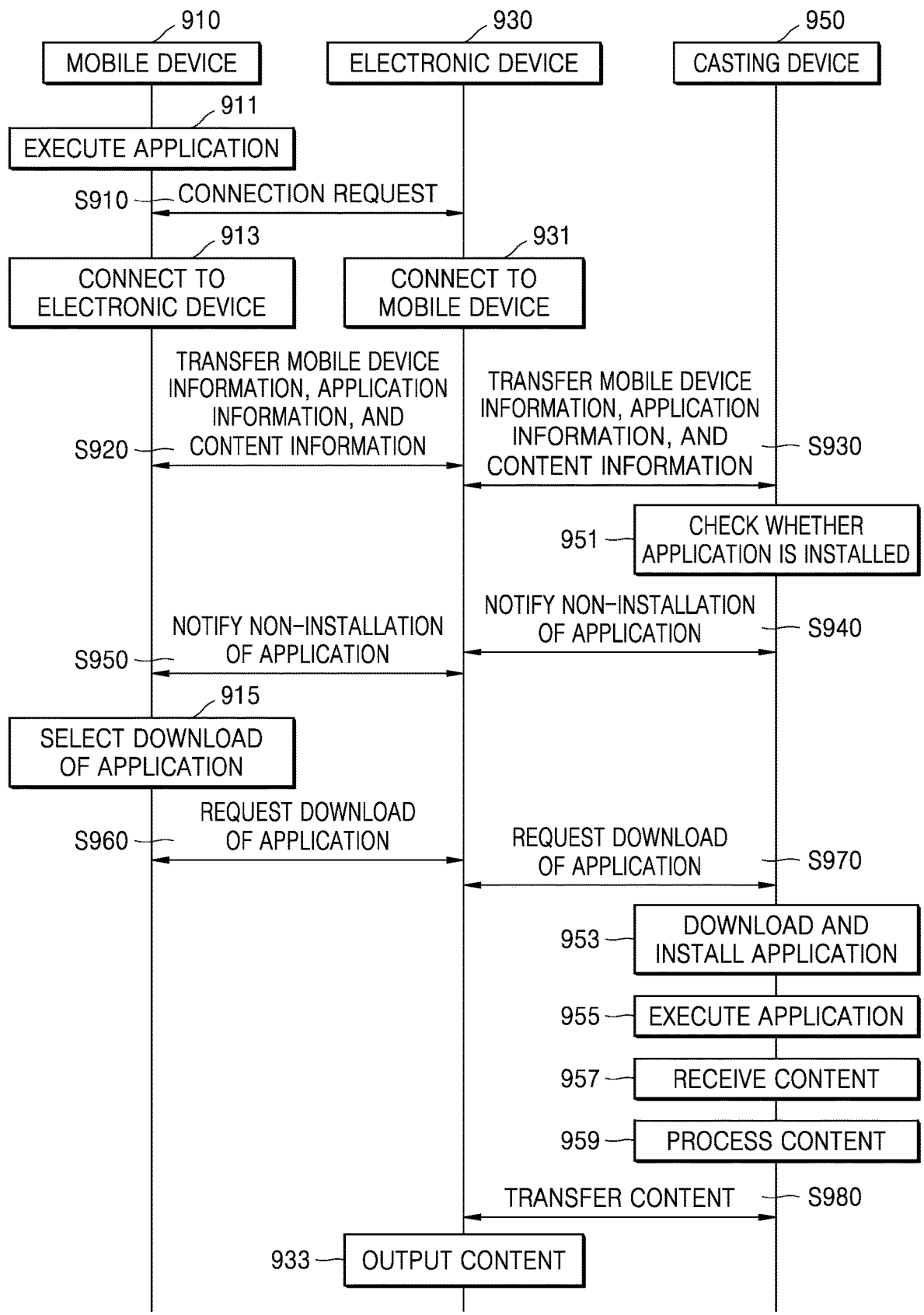
FIG. 9 is a flowchart of operations of a system in which an electronic device outputs content of a mobile device according to another embodiment.

FIG. 9 is a flowchart of operations of a system in which an electronic device outputs content of a mobile device according to another embodiment.

The system shown in FIG. 9 includes a mobile device 910, an electronic device 930, and a casting device 950. FIG. 9 further illustrates an operation flow when a user has selected to download the application in the system shown in FIG. 8 (815). Because operations until the mobile device 910 receives the application non-installation notification from the electronic device 930 (S950) are the same as described with reference to FIG. 8, repeated descriptions thereof will be omitted.

The user of the mobile device 910 may execute the application installed in the mobile device 910 (911) and may be provided with the content through the application. When the user of the mobile device 910 intends to display the content on the electronic device 930 while the content is being provided to the mobile device 910, the mobile device 910 transfers a connection request to the electronic device 930 (S910). The electronic device 930 having received the connection request from the mobile device 910 transmits a response to the connection request (S910), and the electronic device 930 and the mobile device 910 are connected to each other (913, 931).

The mobile device 910 connected to the electronic device 930 transfers, to the electronic device 930, information about the mobile device 910, information about the content that is being reproduced on the mobile device 910, and information about the application reproducing the content (S920). The electronic device 930 connected to the mobile device 910 and having received the pieces of information from the mobile device 910 transfers the pieces of information to the casting device 950 (S930).

The casting device 950 checks whether the application is installed in the casting device 950, based on the received information about the application (951). When it is determined that the application is not installed, the casting device 950 transfers the application non-installation notification to the electronic device 930 (S940), and the electronic device 930 having received the application non-installation notification transfers the application non-installation notification to the mobile device 910 (S950).

The mobile device 910 having received the application non-installation notification displays an interface notifying non-installation of the application, and when downloading the application is selected (915), the mobile device 910 transfers an application download request to the electronic device 930 (S960). The casting device 950 having received the application download request from the electronic device 930 (S970) may download and install the application thereto. Because the casting device 950 according to an embodiment of the disclosure may include a cellular data communication module, the casting device 950 may search for and download the application for the casting device 950 by using a cellular network.

When the download and installation of the application is completed, the casting device 950 executes the application (955) and receives the content from a server by using the cellular network (957). The casting device 950 transfers the content processed by using the executed application to the electronic device 930 (S980), and the electronic device 930 reproduces the content received from the casting device 950 (933).

Figure 10:
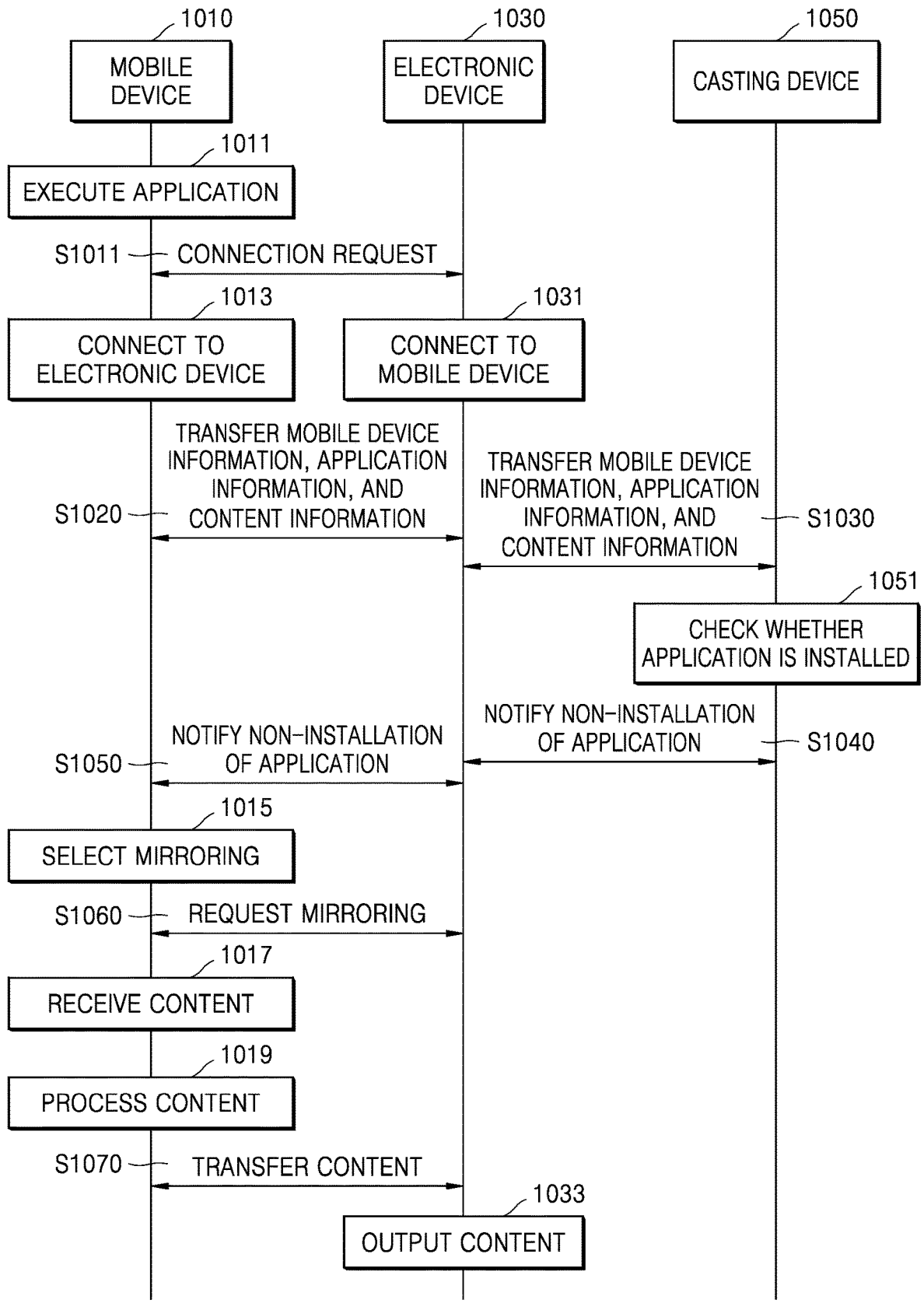
FIG. 10 is a flowchart of operations of a system in which an electronic device outputs content of a mobile device according to another embodiment.

FIG. 10 is a flowchart of operations of a system in which an electronic device outputs content of a mobile device, according to another embodiment of the disclosure.

The system shown in FIG. 10 includes a mobile device 1010, an electronic device 1030, and a casting device 1050. FIG. 10 further illustrates an operation flow when a user has selected mirroring in response to the non-installation of application notification in the system shown in FIG. 8 (815). Because operations until the mobile device 1010 receives the application non-installation notification from the electronic device 1030 (S1050) are the same as described with reference to FIG. 8, repeated descriptions thereof will be omitted.

The mobile device 1010 having received the application non-installation notification displays an interface notifying non-installation of the application, and when mirroring is selected by the user (1015), the mobile device 1010 transfers a mirroring request to the electronic device 1030 (S1060). The electronic device 1030 having received the mirroring request (S1060) sets up a connection to the mobile device 1010 for mirroring, and the mobile device 1010 receives the content from a server (1017), processes the content by using the running application (1019), and then transfers the content to the electronic device 1030 (S1070).

The electronic device 1030 having received the content (S1070) reproduces the content transferred from the mobile device 1010 (1033).

Figure 11:
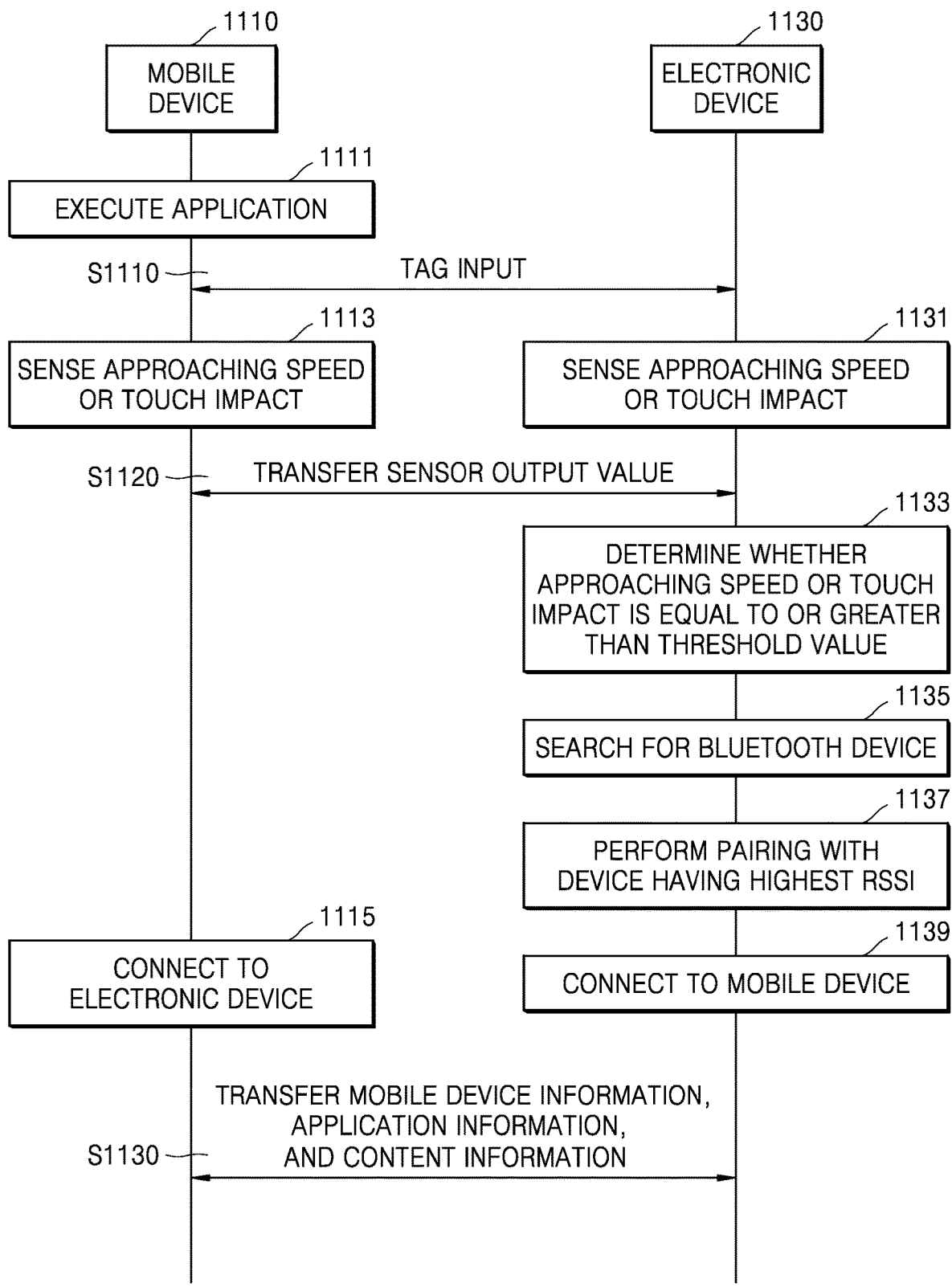
FIG. 11 is a flowchart of operations of connecting a mobile device to an electronic device in a system in which the electronic device outputs content of the mobile device according to an embodiment.

FIG. 11 is a flowchart of operations of connecting a mobile device to an electronic device in a system in which the electronic device outputs content of the mobile device, according to an embodiment.

A user of a mobile device 1110 may execute an application installed in the mobile device 1110 (1111) and may be provided with the content through the application. When the user of the mobile device 1110 intends to display the content on an electronic device 1130 while the content is being provided to the mobile device 1110, the user needs to connect the mobile device 1110 to the electronic device 1130.

Even when the mobile device 1110 and the electronic device 1130 are connected to the same network or constitute the same subnet, for the user of the mobile device 1110 to change settings of the mobile device 1110 by using a menu of the running application, several stages are required to display the content on the electronic device 1130. For example, when it is intended that the content will be reproduced through the electronic device 1130 while the content is being reproduced through YouTube on the mobile device 1110, a casting menu on YouTube needs to be operated, and a device for reproducing a video thereon needs to be directly selected from a list of devices capable of performing casting. In such case, the user may be required to know a name or model of the electronic device 1130 that he or she intends to reproduce the video among the list of electronic devices capable of performing casting.

According to an embodiment, the mobile device 1110 and the electronic device 1130 may be connected to each other by using tag input, and in this case, there is no need to know the name or model of the electronic device 1130.

According to an embodiment, each of the mobile device 1110 and the electronic device 1130 may include an acceleration sensor and a Bluetooth communication module. When the user of the mobile device 1110 brings the mobile device 1110 near the acceleration sensor of the electronic device 1130 and tags the electronic device 1130 with the mobile device 1110 (S1110), the acceleration sensor of each device may sense an approaching speed of each other and a touch impact generated in the process of tagging (1113), and in some cases, the acceleration sensors may exchange sensor output values with each other.

According to an embodiment, when the electronic device 1130 is tapped or tagged with the mobile device 1110, the acceleration sensor in the electronic device 1130 may sense an impact equal to or greater than a threshold value. The electronic device 1130 having sensed the impact equal to or greater than the threshold value may transmits a Bluetooth Low Energy (BLE) pairing signal to surrounding devices directly after the sensing. Here, the acceleration sensor in the mobile device 1110 may also sense the impact equal to or greater than the threshold value. When sensing the impact equal to or greater than the threshold value, the mobile device 1110 may enter a BLE pairing mode and be paired with the electronic device 1130.

However, a method of connecting the mobile device 1110 and the electronic device 1130 to each other is not limited to using the acceleration sensor or the tag input.

The electronic device 1130 determines whether the approaching speed or the touch impact between the two devices, that is, the electronic device 1130 and the mobile device 1110, is equal to or greater than the threshold value, based on the output value of the acceleration sensor of the electronic device 1130 and the output value of the acceleration sensor of the mobile device 1110 (1133). When it is determined that the approaching speed or the touch impact is less than the threshold value, the tagging may be considered as unintentional tagging.

When it is determined that the approaching speed or the touch impact between the two devices is equal to or greater than the threshold value, surrounding Bluetooth devices are searched for (1135). In this case, because the mobile device 1110 approaches and tags the electronic device 1130, there is a high possibility that a Bluetooth response of the mobile device 1110 will be received at the highest intensity. Accordingly, the electronic device 1130 estimates a response having highest Received Signal Strength Indication (RSSI) as a response of the mobile device 1110 requesting a connection and performs pairing with the mobile device 1110 transmitting the response having highest RSSI (1337).

In the connection method using Bluetooth according to an embodiment of the disclosure, because the user does not need to directly perform a device selection input, user experience may be improved by improving continuity of use. However, the method of connecting the mobile device 1110 and the electronic device 1130 to each other is not limited to using Bluetooth.

When the electronic device 1130 and the mobile device 1110 are connected to each other through Bluetooth pairing (1115, 1139), the mobile device 1110 transfers, to the electronic device 1130, information about the mobile device 1110, information about the content that is being reproduced on the mobile device 1110, and information about the application reproducing the content (S1130). Here, the mobile device 1110 and the electronic device 1130 may respectively perform transmission and reception of the pieces of information by using Wi-Fi direct instead of using Bluetooth response.

In addition, when the electronic device 1130 is registered as a manageable device with the mobile device 1110, services may be used with more convenience and continuity. When the electronic device 1130 is registered only once before first connection between the mobile device 1110 and the electronic device 1130, the mobile device 1130 may store information of the electronic device 1130 at the stage of registration, and the electronic device 1130 may also store information of the mobile device 1110. Accordingly, after this, the mobile device 1130 and the electronic device 1130 may share the information of each other without a separate process of registration or network connection.

In addition, when an integrated management application for integrally managing connection devices capable of supporting the mobile device 1110 is used, the electronic device 1130 and the casting device may be more easily managed.

According to an embodiment, the electronic device 1130 may continuously perform BLE device searching (BLE advertising), and the mobile device 1110 may recognize the electronic device 1130 through BLE. When the user selects the registration of the electronic device 1130 in the integrated management application, the mobile device 1110 may perform pairing with the electronic device 1130, and the electronic device 1130 may be registered with the integrated management application.

According to an embodiment, the electronic device 1130 may transfer, to the mobile device 1110, the presence and information of the casting device connected to the electronic device 1130.

Figure 12:
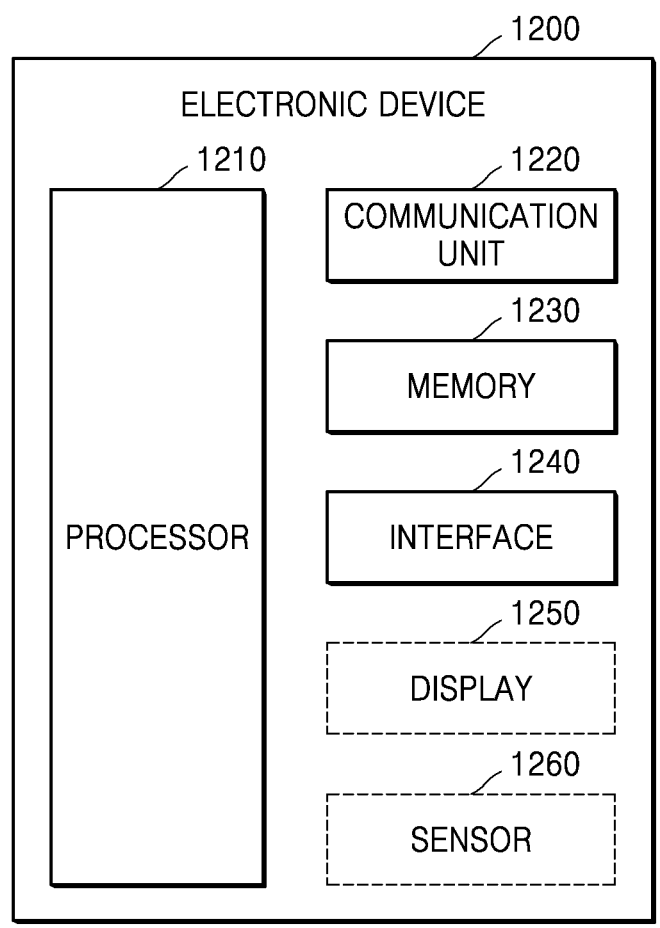
FIG. 12 is a block diagram illustrating a hardware configuration of an electronic device according to an embodiment.

FIG. 12 is a block diagram illustrating a hardware configuration of an electronic device according to an embodiment.

Referring to FIG. 12, an electronic device 1200 may include a processor 1210, a communication unit 1220, a memory 1230, an interface 1240, a display 1250, and a sensor 1260. FIG. 12 illustrates only components of the electronic device 1200, the components being related to the embodiments of the disclosure. Therefore, it will be understood by those of ordinary skill in the art that the electronic device 1200 may further include components other than the components shown in FIG. 12.

The electronic device 1200 may be variously implemented by a television, a projector, a monitor, or the like.

The processor 1210 may control a series of processes for reproducing, on the electronic device, the content that is being reproduced on the mobile device, the processes having been described with reference to FIGS. 1 to 11.

In addition, the processor 1210 controls overall functions for controlling the electronic device 1200. For example, the processor 1210 takes overall control of the electronic device 1200 by executing programs stored in the memory 1230 in the electronic device 1200. The processor 1210 may be implemented by, but is not limited to, a central processing unit (CPU), a graphic processing unit (GPU), an application processor (AP), or the like included in the electronic device 1200.

By using a communication module such as a Bluetooth module or a wired or wireless local area network (LAN) module, the communication unit or interface 1220 may connect to other devices and may transmit and receive data.

The memory 1230 is a piece of hardware for storing various types of data processed in the electronic device 1200, and, for example, the memory 1230 may store pieces of data received by the communication unit 1220 and pieces of data processed and to be processed by the electronic device 1200. In addition, the memory 1230 may store applications, drivers, and the like to be driven by the electronic device 1200.

The memory 1230 may include random access memory (RAM) such as dynamic random access memory (DRAM) or static random access memory (SRAM), read-only memory (ROM), electrically erasable programmable read-only memory (EEPROM), CD-ROM, blu-ray or other optical disk storage, a hard disk drive (HDD), a solid state drive (SSD), or flash memory.

The interface 1240 may receive audio data, image data, and other data through an HDMI port, a USB port, an optical port, or the like.

The display 1250 displays pieces of data received through the interface 1240 and may be included in the electronic device 1200 as in the case of a television or, according to another embodiment, may be outside the electronic device 1200 as in the case of a projector.

The electronic device 1200 may include the sensor 1260, and the sensor 1260 may sense the presence, changes, or the like of signals around the electronic device 1200. According to an embodiment, in the case where a mobile device approaches or contacts the electronic device 1200 and when the electronic device 1200 determines that the acceleration of the mobile device is equal to or greater than a predetermined threshold value, the electronic device 1200 may connect to the mobile device. Alternatively, when contact is sensed by using a contact sensor such as a near field communication (NFC) sensor, the electronic device 1200 may connect to the mobile device.

Here, when the mobile device also includes a sensor, the mobile device may also determine whether to connect to the electronic device 1200 in a similar manner by using the sensor, and the mobile device and the electronic device 1200 may use more accurate data by exchanging sensor sensing values with each other.

Figure 13:
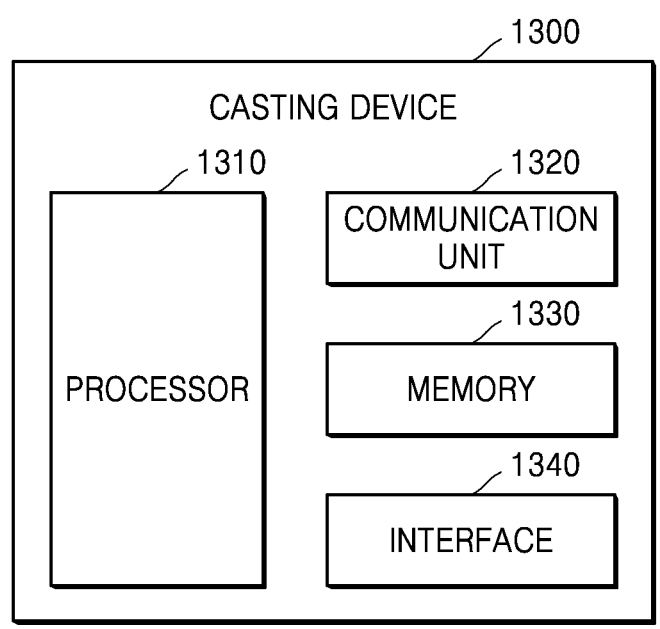
FIG. 13 is a block diagram illustrating a hardware configuration of a casting device according to an embodiment.

FIG. 13 is a block diagram illustrating a hardware configuration of a casting device according to an embodiment.

Referring to FIG. 13, a casting device 1300 may include a processor 1310, a communication unit 1320, a memory 1330, and an interface 1340. FIG. 13 illustrates only components of the electronic device 1300, the components being related to the embodiments of the disclosure. However, it will be understood by those of ordinary skill in the art that the electronic device 1300 may further include components other than the components shown in FIG. 13.

The processor 1310 may control a series of processes for reproducing, on the electronic device, the content that is being reproduced on the mobile device, the processes having been described with reference to FIGS. 1 to 11.

In addition, the processor 1310 controls overall functions for controlling the casting device 1300. For example, the processor 1310 takes overall control of the casting device 1300 by executing programs stored in the memory 1330 in the casting device 1300. The processor 1310 may be implemented by, but is not limited to, a CPU, a GPU, an AP, or the like included in the casting device 1300.

By using a communication module such as a Bluetooth module or a wired or wireless LAN module, the communication unit 1320 may connect to other devices and may transmit and receive data. Because the communication unit 1320 of the casting device 1300 according to an embodiment is able to perform cellular data communication, the casting device 1300 may directly download an application or directly receive content from a content server without use of wired or wireless LAN or the like.

The memory 1330 is a piece of hardware for storing various types of data processed in the casting device 1300, and, for example, the memory 1330 may store pieces of data received by the communication unit 1320 and pieces of data processed and to be processed by an application. In addition, the memory 1330 may store applications, drivers, and the like to be driven by the casting device 1300.

The memory 1330 may include RAM such as DRAM or SRAM, ROM, EEPROM, CD-ROM, blu-ray or other optical disk storage, an HDD, an SSD, or flash memory.

The interface 1340 may receive audio data, image data, and other data through an HDMI port, a USB port, an optical port, or the like.

The above-described embodiments of the disclosure may be implemented in the form of program instructions or code executable by various computer components and recorded on a non-transitory computer-readable recording medium. The computer-readable recording medium may include program instructions, data files, data structures, or the like alone or in combination. Examples of the computer-readable recording medium may include a magnetic medium such as a hard disk, a floppy disk, and magnetic tape, an optical recording medium such as CD-ROM and a digital versatile disk (DVD), a magneto-optical medium such as a floptical disk, and a hardware device, such as ROM, RAM, or flash memory, which is configured to store and execute program instructions. Examples of the program instructions may include machine language code produced by a compiler and a high-level language code executable by a computer by using an interpreter or the like. The hardware device may be changed into one or more software modules to perform processing according to the disclosure, and vice versa.

According to an embodiment, a mobile device and an electronic device capable of displaying do not need to be connected to the same network or constitute the same subnet, and a casting device may also provide content through the electronic device even without being connected to the same subnet. In addition, the casting device may download an application by using a communication function of its own, and thus, application expandability is ensured. Further, because a user of the mobile device does not need to manipulate the mobile device to connect the mobile device to the electronic device, continuity of use may be improved.

Although some embodiments of the disclosure have been described with reference to the accompanying drawings by way of particular examples, it should be understood by those of ordinary skill in the art that the embodiments of the disclosure are provided merely for thorough understanding of the disclosure and are not intended to limit the scope of the disclosure, and that various changes and modifications may be made therein without departing from the spirit and scope of the disclosure.

Therefore, the scope of the disclosure is not limited to the above-described embodiments and should be defined by the appended claims and equivalents thereof.

What is claimed is:

1. A method of providing content, performed by an electronic device, the method comprising:
   receiving a connection request from a mobile device;
   connecting to the mobile device based on the connection request;
   obtaining, from the mobile device, identification information of the mobile device, application information of an application running on the mobile device, and content information about the content to be processed by the application;
   transmitting the identification information, the application information, and the content information to a casting device capable of performing cellular data communication;
   obtaining the content from the casting device; and
   outputting the content,
   wherein the content obtained from the casting device is received by the casting device through a cellular data communication network based on the content information and processed based on the application executed on the casting device.

2. The method of claim 1, wherein the receiving the connection request is based on a sensing result of a sensor in at least one of the mobile device or the electronic device.

3. The method of claim 1, wherein the connecting to the mobile device comprises connecting by using Bluetooth communication.

4. The method of claim 1, wherein the obtaining of the identification information of the mobile device, the information about the application running on the mobile device, and the information about the content to be processed by the application comprises connecting to the mobile device by using Wi-Fi communication.

5. The method of claim 1, wherein the electronic device and the casting device communicate with each other by using high definition multimedia interface (HDMI) communication.

6. A method of providing content, performed by a casting device, the method comprising:
   obtaining, from an electronic device connected to a mobile device, identification information of the mobile device, application information of an application running on the mobile device, and content information about the content to be processed by the application;
   executing the application based on the application information;
   receiving, from a server, the content through a cellular data communication network, based on the content information about the content;
   processing the received content according to the executed application; and
   transmitting the processed content to the electronic device.

7. The method of claim 6, wherein the executing the application comprises:
   determining whether the application is installed on the casting device, based on the application information;
   based on determining that the application is not installed on the casting device, downloading the application through the cellular data communication network; and
   installing the application on the casting device.

8. The method of claim 6, wherein the application information comprises information about a user account, and
   wherein the application is executed based on the information about the user account.

9. The method of claim 6, wherein the electronic device and the casting device communicate with each other using high definition multimedia interface (HDMI) communication.

10. An electronic device for providing content, the electronic device comprising:
    a communication interface configured to receive a connection request from a mobile device;
    an interface; and
    a processor configured to:
      control the communication interface to connect to the mobile device based on the connection request;
      obtain, from the mobile device, identification information of the mobile device, application information of an application running on the mobile device, and content information about the content to be processed by the application;
      transmit, through the interface, the identification information, the application information, and the content information to a casting device capable of performing cellular data communication;
      obtain the content from the casting device through the interface; and
      output the content,
    wherein the content obtained from the casting device is received by the casting device through a cellular data communication network based on the content information and processed based on the application executed on the casting device.

11. The electronic device of claim 10, further comprising at least one sensor,
    wherein the connection request is based on a sensing result of at least one of the mobile device or the at least one sensor.

12. The electronic device of claim 10, wherein the communication interface is further configured to support Bluetooth communication and connect to the mobile device based on the Bluetooth communication.

13. The electronic device of claim 10, wherein the communication interface is further configured to support Wi-Fi communication, and
    the identification information of the mobile device, the information about the application running on the mobile device, and the information about the content to be processed by the application are obtained based on a Wi-Fi connection.

14. The electronic device of claim 10, wherein the interface comprises a high definition multimedia interface (HDMI), and
    wherein the electronic device is connected to the casting device through the HDMI.

15. A casting device for providing content, the casting device comprising:
    an interface configured to obtain, from an electronic device connected to a mobile device, identification information of the mobile device, application information of an application running on the mobile device, and content information about the content to be processed by the application;
    a communication interface; and
    a processor configured to:
      execute the application based on the application information;
      control the communication interface to receive, from a server, the content through the cellular data communication network based on the content information;
      process the received content according to the executed application; and
      transmit the processed content to the electronic device.

16. The casting device of claim 15, wherein the processor is further configured to:
    determine whether the application is installed on the casting device, based on the application information;
    based on determining that the application is not installed on the casting device, download the application through the cellular data communication network; and
    install the application on the casting device.

17. The casting device of claim 15, wherein the application information comprises information about a user account, and
    wherein the application is executed based on the information about the user account.

18. The casting device of claim 15, wherein the interface comprises a high definition multimedia interface (HDMI), and wherein the casting device is connected to the electronic device by using the HDMI.

19. A non-transitory computer-readable recording medium having recorded thereon a computer program for performing the method of claim 1.

20. A non-transitory computer-readable recording medium having recorded thereon a computer program for performing the method of claim 6.

* * * * *